United States Patent Office 3,302,760
Patented Feb. 7, 1967

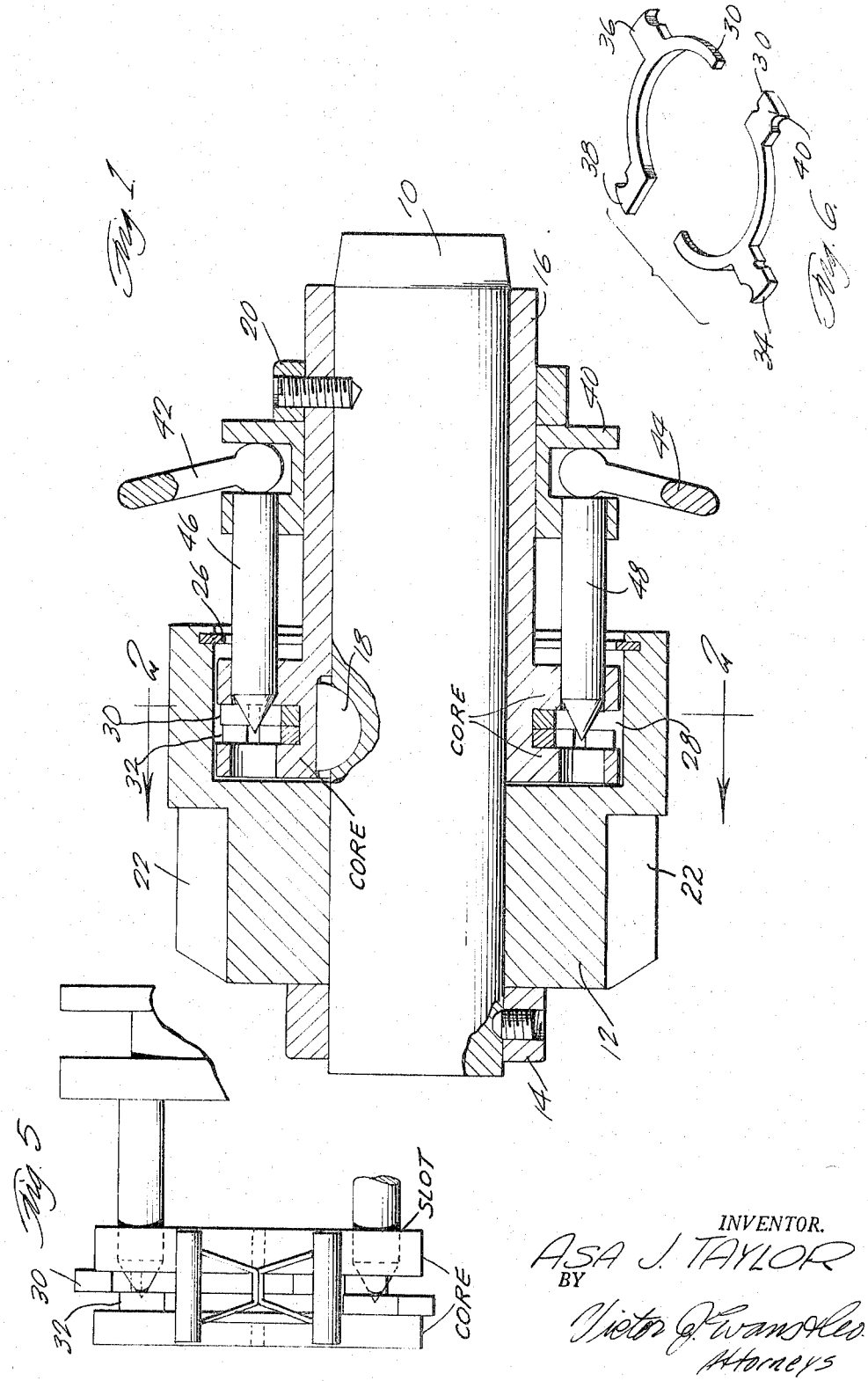

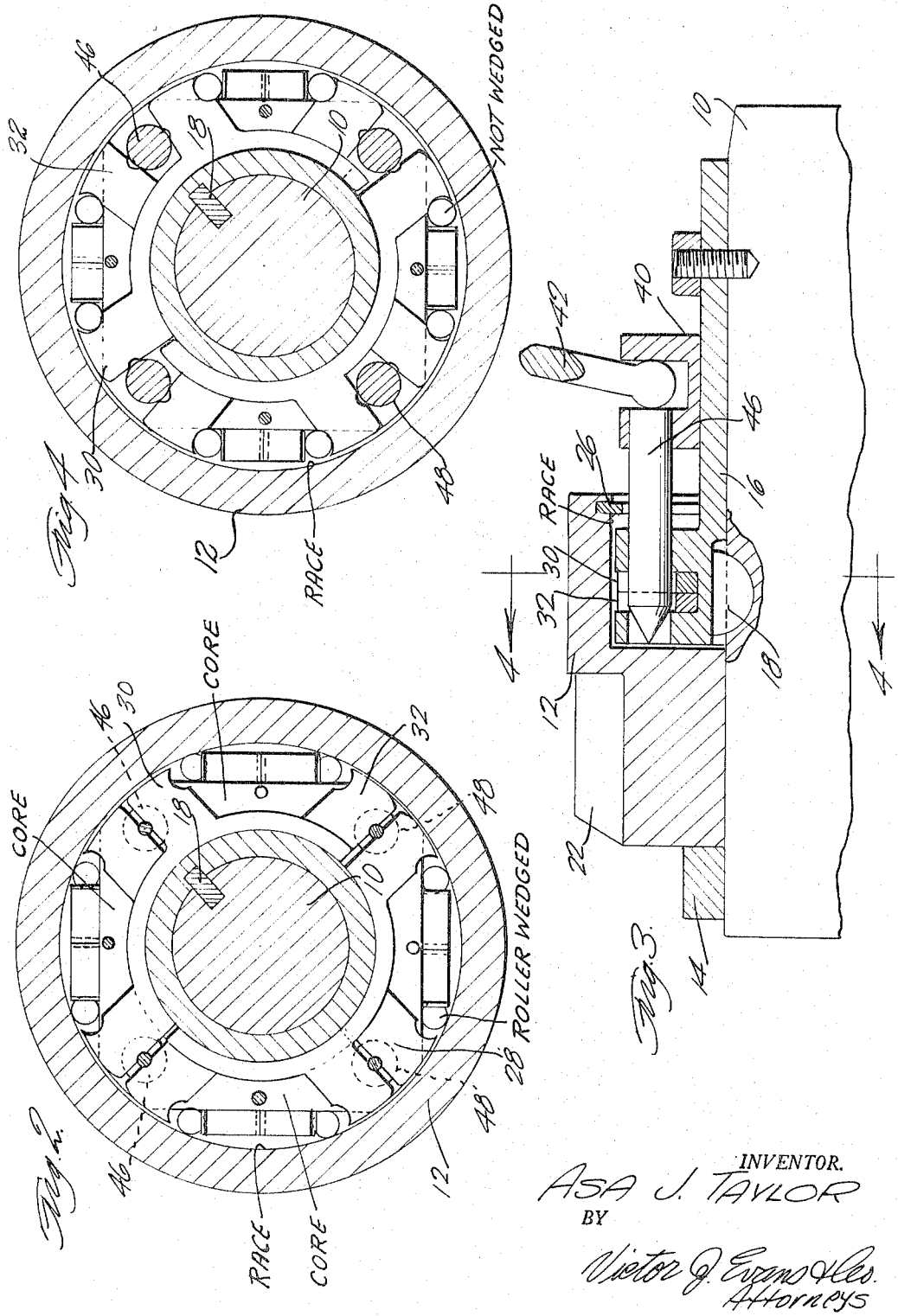

3,302,760
CONTROL MEANS FOR AN ALL-METAL CLUTCH
Asa J. Taylor, 3110 Ezekiel Ave., Zion, Ill. 60099
Filed Mar. 17, 1965, Ser. No. 440,447
4 Claims. (Cl. 192—38)

The present invention relates to improved control means or release means for an all-metal clutch, and more particularly relates to means for releasing and controlling the wedged rollers of an overrunning clutch and alike.

Overrunning clutches and their principles are well known and the present invention particularly relates to the manner and means in which the structure of the present invention releases the rollers in an overrunning clutch.

In the present invention the structure is provided so that the rollers are released as desired and are then held in a position suspended from contact with the race or raceway and, in this way it is possible in accordance with the teaching of the present invention to shift from say one gear to another, regardless of the difference in the speed of the two given gears, and this in accordance with the present invention may be done instantaneously and without noise or other abrupt operation of the equipment components.

An object therefore of the present invention is to provide for a gear or pulley system a clutch having a race attached to the side and in which the clutch is inside of the race, having a sliding collar with the pins perched within the clutch. The gear is thus free to roll on the shaft until the collar is pulled out until it hits a stop means so that the clutch will be holding the gear and thus the gear may not be turned in either direction until the collar and pins are perched back into the other direction so that the gear is again free.

A further object of the present invention is to provide a disc or split-disc member having lugs which are off-set at approximately 90 degrees so that they contact directly the rollers toward the center and the flat spring contacts the rollers on the other side for providing a 3 point contact. As the lugs and the spring are shaped at the point of contact with the rollers there is provided a cradle or holding means for the rollers. As the lugs move the rollers together they move along the flat surface of the core and do not contact the race because they are small.

A further object of the present invention is to provide a return spring composed of two half-elliptic pieces having a lug in the form as disclosed and spot welded at the center to overcome centrifugal forces that drag upon the race.

As the pins are pulled out of the core, the return spring forces the rollers apart to the wedging position. Then the direction of rotation which set the rollers to wedge make the clutch bi-directional in nature.

A further object of the present invention is to provide a breaking action which is obtained by using one disc with lugs for releasing one set of rollers. The bi-directional feature above referred to may also be used where a shaft is required to operate in either direction, as the agitator shaft of a washing machine so that the action is automatic with no lack in change of direction.

The above and other objects and advantages of the invention will become apparent upon full consideration of the following detailed description and accompanying drawings in which:

FIGURE 1 is a side elevation of the shaft and clutch arrangement, shown partially in cross sectional view, in accordance with a preferred embodiment of the present invention.

FIGURE 2 is a cross sectional view taken along lines 2—2 of FIGURE 1.

FIGURE 3 is a broken-away view similar to FIGURE 1 in which the pin is shown in a position displaced from that of FIGURE 1.

FIGURE 4 is a cross sectional view taken along lines 4—4 of FIGURE 3.

FIGURE 5 shows a view similar to that of FIGURES 1 and 3 showing the detail of the displacing pin of the clutch and a spring mechanism used incident therein, and FIGURE 6 shows a perspective view of the pair of half-elliptic or substantially circular pieces having lugs showing a component element of the improved control for an all-metal clutch in accordance with a preferred embodiment of the present invention.

Referring now to the drawings there is shown a shaft 10 and a gear or pulley housing 12 mounted upon said shaft and having an axially retaining member 14 at a lower end thereof, and there is further disposed upon said shaft a sleeve 16 which is retained thereon by a key 18, said sleeve also having a retaining member 20.

The gear or housing member 12 may be disposed to have either a pulley or a gear peripheral structure, and in the embodiment shown in FIGURES 1 and 3, there is suggested a gear structure having the teeth 22, 24. The gear member 12 is disposed to include a recess which annularly is disposed about the shaft and within the housing member 12, said recess 24 having a snap ring 26 and which extends annularly about the recess 24 to keep the rollers in place. Within the recess is the improved clutch mechanism 28 which includes a set of apertured discs disposed in stacked-array and shown as elements 30, 32 in FIGURES 1–5. This comprises a set each of which is similar to the assembly shown in a split arrangement of FIGURE 6. The disc structure includes projections 34, 36, 38, 40 each of which contains on each side thereof circularly disposed recesses or apertures as is shown.

Also disposed about the shaft 10 and extending outwardly in circumferential and sliding engagement with the sleeve 16 is a sliding collar 40 which is selectively driven upwards or downwards, or in other words along an actual direction of the shaft 10 by a control arm 42, 44. In the position shown in FIGURE 2, the control arms 42, 44 remove the pins 46, 48 from the clutch mechanism 28 so that the components are eventually engaged, i.e., the clutch is engaged when the pins are out, and the clutch is disengaged when the pins are in. In the embodiment shown in FIGURE 3 the rod 42 is shown having displaced the sliding collar 40 to a lateral position so that the pins 46, 48 are interposed between the discs 30 and 32 as is shown in FIGURE 4 and which caused the clutch rollers to engage the race.

Additional embodiments of the invention in this specification will occur to others and therefore it is intended that the scope of the invention be limited only by the appended claims not by the embodiment described hereinabove. Accordingly reference should now be made to the following claims in determining the full scope and recitation of the invention.

What is claimed is:

1. In a clutch mechanism including roller members, split disc members having apertured projections, said roller members being disposed between the apertured projections about the split disc members, a gear or pulley housing, a shaft disposed in said gear or pulley housing, a gear mounted on said shaft, said gear having an annular recess about the shaft, a sleeve mounted on and keyed to said shaft, said sleeve extending within said recess, said split disc members extending into said recess, a sliding collar annularly disposed about said sleeve and having pins whose ends are axially extendable into engagement with said apertured projections of said disc members.

2. The invention according to claim 1 wherein a return spring is engaged with roller members in a race, said return spring releasing said roller members and retaining said roller members in a suspended position from contact in said race.

3. In a clutch mechanism including roller members disposed about and between projections of apertured disc members, a shaft on which said clutch mechanism is mounted, a gear having an annular recess about a portion of said shaft and another portion of said gear being mounted in slidable engagement thereon, a sleeve mounted on and keyed to said shaft, said sleeve extending into and within said recess, said apertured disc members disposed in said recess and having a plurality of projections peripherally disposed about said discs, gear pins, and a sliding collar annularly disposed about said sleeve and having said gear pins in which an end thereof extends axially into engagement with said projections of said disc members.

4. The invention according to claim 3 wherein displacement rods are provided for displacing the sliding collar in actuating the clutch mechanism.

References Cited by the Examiner

UNITED STATES PATENTS

| 1,533,955 | 4/1925 | Tandel | 192—77 |
| 2,291,151 | 7/1942 | Dunn | 192—38 |
| 2,562,466 | 7/1951 | Kesterton | 192—77 |

DAVID J. WILLIAMOWSKY, *Primary Examiner.*

A. T. McKEON, *Assistant Examiner.*